US012103558B1

(12) United States Patent
Kavalar

(10) Patent No.: US 12,103,558 B1
(45) Date of Patent: Oct. 1, 2024

(54) PROBABILITY CALCULATION OF ENCOUNTERING SCENARIOS USING EMULATOR MODELS

(71) Applicant: Zoox, Inc., Foster City, CA (US)

(72) Inventor: Andraz Kavalar, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 501 days.

(21) Appl. No.: 17/333,602

(22) Filed: May 28, 2021

(51) Int. Cl.
*B60W 60/00* (2020.01)
*B60W 30/095* (2012.01)

(52) U.S. Cl.
CPC .... *B60W 60/0016* (2020.02); *B60W 30/0953* (2013.01); *B60W 30/0956* (2013.01); *B60W 2720/106* (2013.01)

(58) Field of Classification Search
CPC ......... B60W 60/0016; B60W 30/0953; B60W 30/0956; B60W 2720/106
See application file for complete search history.

(56) References Cited

U.S. PATENT DOCUMENTS

| | | | |
|---|---|---|---|
| 2020/0167691 A1* | 5/2020 | Golovin | G06N 20/00 |
| 2022/0019857 A1* | 1/2022 | Ito | G06N 5/01 |
| 2022/0067236 A1* | 3/2022 | Cox | G06F 30/20 |
| 2022/0092237 A1* | 3/2022 | Vandamme | G06F 30/20 |
| 2022/0242441 A1* | 8/2022 | Thompson | G06V 10/774 |
| 2022/0340171 A1* | 10/2022 | Halder | B60W 60/0025 |

OTHER PUBLICATIONS

H. Beglerovic, M. Stolz and M. Horn, "Testing of autonomous vehicles using surrogate models and stochastic optimization," 2017 IEEE 20th International Conference on Intelligent Transportation Systems (ITSC), Yokohama, Japan, 2017, pp. 1-6, doi: 10.1109/ITSC.2017.8317768. (Year: 2017).*

* cited by examiner

*Primary Examiner* — Abby Y Lin
*Assistant Examiner* — Danielle M Jackson
(74) *Attorney, Agent, or Firm* — Lee & Hayes, P.C.

(57) ABSTRACT

Techniques are discussed herein for executing and evaluating simulations and/or emulations based on parameterized scenarios, such as driving scenarios used to analyze and evaluate the responses of autonomous vehicle controllers. A surrogate model may be determined by simulating points in a simulation parameter space with a simulator to determine the surrogate model while capturing the main features of the simulation model. Additionally, relevant areas of the parameter space, such as, areas containing parameters associated with events occurring infrequently during simulations, may be quickly identified using Bayesian optimization techniques. An iterative evaluation of an acquisition function may delineate a contour associated with the region of interest, and the surrogate model may be evaluated to determine a probability of returning a result corresponding to a parameter being within the contour. The probabilities may be further analyzed to determine scenario/vehicle performance metrics access the scenario parameter space.

20 Claims, 5 Drawing Sheets

PROBABILITY CALCULATION OF ENCOUNTERING SCENARIOS USING EMULATOR MODELS

BACKGROUND

Simulations can be used to test and validate the features and functionalities of systems, including those that may be otherwise prohibitive to test in real world environments for example, due to safety concerns, limitations on time, repeatability, etc. For example, autonomous vehicles may use driving simulations to test and improve the performance of the vehicle control systems with respect to passenger safety, vehicle decision-making, sensor data analysis, route optimization, and the like. However, driving simulations that accurately reflect real world scenarios may be difficult and expensive to create and execute, as the data used to create such simulations may be noisy, inconsistent, or incomplete. Additionally, execution of driving simulations may involve executing multiple different interacting systems and components, including the vehicle control systems being evaluated, as well as agents and other objects in the simulated environment, which may be resource and computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
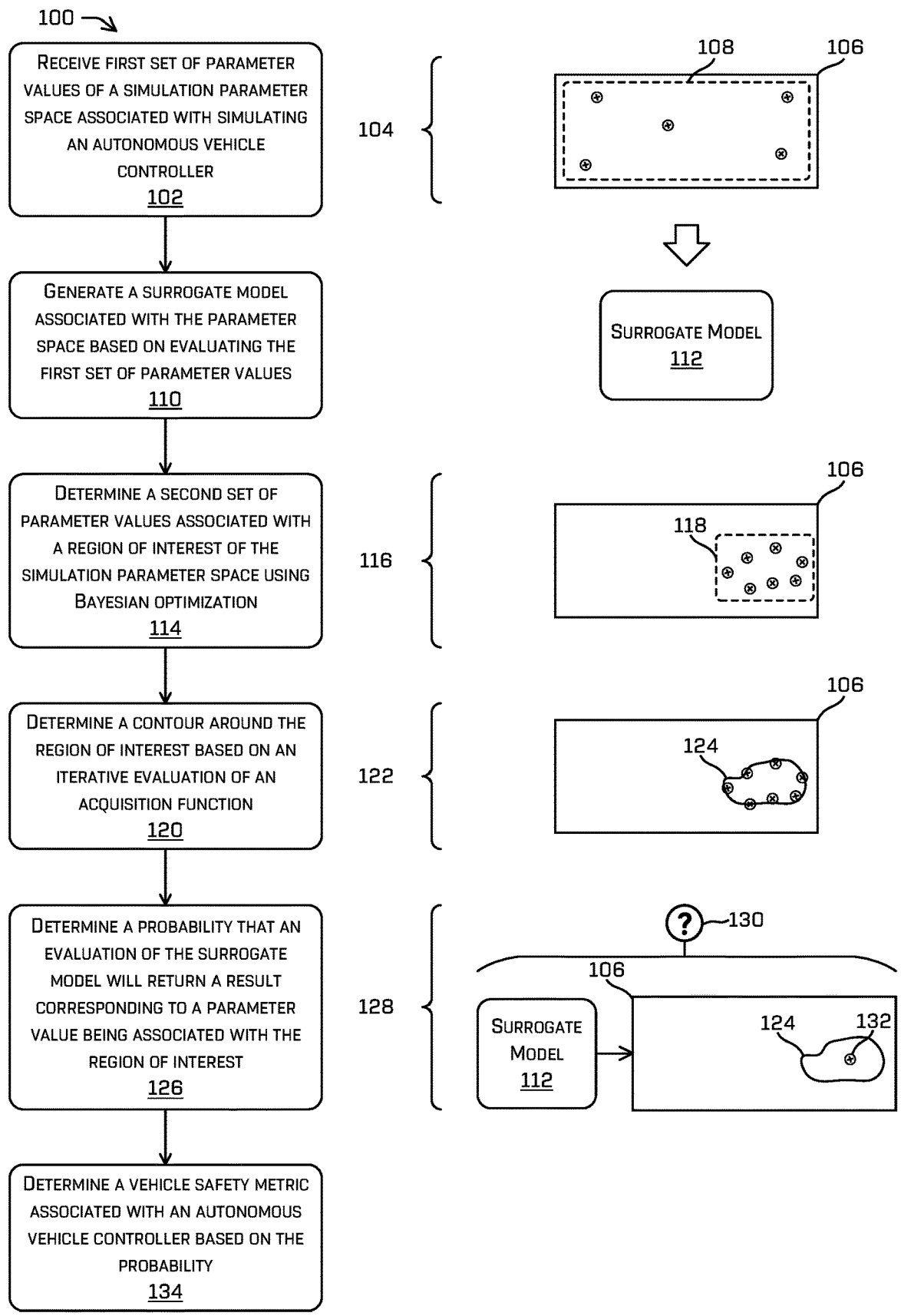
FIG. 1 illustrates a pictorial flow diagram of an example process of generating a surrogate model, determining a contour, and determining a vehicle safety metric associated with an autonomous vehicle controller based on a probability that an evaluation of the surrogate model will return a result that corresponds to a parameter being associated with a region of interest.

The techniques discussed herein relate to executing and evaluating simulations and/or emulations based on parameterized scenarios. In various examples, simulations may include driving simulations in which an autonomous vehicle controller is executed within a parameterized driving scenario. During the execution of a driving simulation, the autonomous vehicle controller may interact with static and/or dynamic objects within a simulated environment. Within the context of driving scenario simulations and/or computer-based simulations, the techniques discussed herein include emulating simulations of parameterized scenarios and using analytics to calculate a probability of encountering a parameter of a parameter space that will return a particular result of interest. In some examples, an emulator, or a surrogate model, may be determined, or otherwise generated, to bypass an expensive-to-evaluate model, such as, a simulator, for example. The surrogate model may be determined by intelligently simulating points in a simulation parameter space with the simulator until there is enough simulation results to build the surrogate (approximating) model while capturing the main features of the simulation model. Once constructed, queries may be performed on the surrogate model without incurring the compute cost of directly simulating such scenarios.

For example, a single simulation may take up to 5 minutes, which leads to compute, time, and other constraints when simulating tens of thousands of single scenarios. However, by simulating a small subset of the scenarios, such as, 500, for example, enough data can be gathered to train the surrogate model how the simulation model behaves in certain areas of a parameter space. The results of the remaining scenarios may then be emulated by the surrogate model instead of the expensive-to-evaluate simulation model. Additionally, or alternatively, the results of the scenarios that have been emulated by the surrogate model (the emulation results) may be validated by evaluating the scenarios using the simulation model and comparing those simulation results with the emulation results.

Additionally, further compute resources and time may be saved by employing an optimization function and/or an acquisition function to intelligently identify relevant areas of a parameter space (e.g., parameters associated with events occurring infrequently during simulations) as quickly as possible. For example, using Bayesian optimization and an associated acquisition function, iteratively performing the Bayesian optimization may return results associated with a particular event of interest (e.g., using a threshold value associated with a high risk of such an event) and the corresponding parameters may be identified as an area of interest in the parameter space. In some examples, the Bayesian optimization and/or an associated acquisition function may use previous results as at least partial input for a subsequent evaluation, thus returning more accurate results with each evaluation of the function.

Once a computational budget for the function has been exhausted, a threshold number of iterations has been reached, a change in the surrogate model is less than or equal to some threshold change, and/or during each iteration of the evaluation, a contour may be determined in association with the region of interest. For example, each iteration may return a set of results that correspond to parameters associated with the threshold value of the particular event of interest. That is, the threshold value associated with the particular event of interest may identify the contour (i.e., level set, excursion set, etc.). It should be noted that multiple contours may be determined, where each individual contour may represent a respective threshold value associated with the particular event of interest (e.g., the further the contour from the region of interest, the greater the threshold). As previously mentioned, with each iteration, the acquisition function may return more accurate results, thus updating the contour with each result leading to a more accurate contour. With the contour in place, a probability model and/or an exposure model may be imposed onto the contour (or vice versa) to determine a probability that an evaluation of the surrogate model will return a result corresponding to a parameter being within the contour. The probability may be further analyzed in the context of the particular event of interest to determine a vehicle safety metric associated with an autonomous vehicle controller. In some examples, the vehicle safety metric may represent a likelihood of a vehicle encountering an adverse event under control of a simulated autonomous vehicle controller. Examples of an adverse event may include scenarios such as a collision or near-collision between a vehicle under control of the simulated autonomous vehicle controller and a simulated object (e.g., a car, a pedestrian, a bicyclist, a building, etc.).

Certain techniques and examples described herein may provide technical advantages for executing and evaluating simulations and/or emulations, and in particular for detecting and quantifying events occurring infrequently during simulations. For example, during driving simulations in a scenario for an autonomous vehicle, interactions (e.g., collisions) between the simulated autonomous vehicle and other objects in the simulation may occur only rarely within the particular scenario. However, detecting and analyzing the collisions that occur in driving simulations is important for vehicle and passenger safety, both to determine the causes of the collisions, and to determine the remedial actions that can be taken by the autonomous vehicle to avoid the collisions in real-world driving scenarios. Additionally, detecting and analyzing collisions during driving simulations is important for accurately quantifying the probability of such collisions in order to determine vehicle and/or scenario safety metrics, assess driving risks, and improve vehicle safety during real-world driving conditions.

Conventional systems used to detect and quantify events occurring with simulations often use brute force techniques, during which parameterized scenarios are generated and executed as simulations, and then evaluated to determine if the event occurred during the simulation. However, generating and executing driving simulations requires significant computational resources and time, which makes detecting and quantifying rare events within simulations difficult and/or technically impractical. The less frequently that an event occurs during a simulation, such as collision during a driving simulation, the greater the number of simulations and the amounts of computing resources that will be required to detect occurrences of the event. Additionally, as fewer occurrences of the event are detected using sampling-based techniques for generating and executing simulations, the resulting probability estimates for the event are less reliable.

In contrast to conventional systems that use brute force sampling to generate, execute, and evaluate parameterized scenarios, the techniques described herein may improve the detection of events occurring infrequently during simulations (and/or emulations), and also may improve the probability calculations used to quantify the likelihood of such events. For instance, by using an optimization (e.g., Bayesian optimization) to identify parameters associated with a region of interest and using an acquisition function determine the contour, various examples described herein may have improved success rates for detecting infrequent events during simulations. Additionally, by intelligently simulating a sufficient subset of points (e.g., until there are enough simulation results to build the surrogate model while capturing the main features of the simulation model) in a simulation parameter space, a significant amount of time and computational resources may be saved by evaluating the emulator rather than evaluating tens of thousands of costly simulations with a brute force method. Further, employing the optimization algorithm and the acquisition function in combination with the surrogate model may result in less computationally expensive evaluations that increase in accuracy with each subsequent evaluation, since the acquisition function may use previous results as at least partial input for a subsequent evaluation. As such, the techniques described herein may reduce the latency for simulating scenarios. As may be understood, reducing latency of simulating scenarios may improve safety outcomes, particularly in the context of vehicles and autonomous vehicles. Thus, the techniques described herein may improve a functioning of a computing device as well as improve safety outcomes.

The techniques described herein may be implemented in a number of ways. Example implementations are provided below with reference to the following figures. Although certain examples are discussed in the context of detecting events such as vehicle collisions within driving simulations, in other examples, the methods, devices, systems, computer-readable media, and/or other implementations described herein may be applied to a variety of other environments, such as utilization to detect other types of events occurring within simulations involving semi-autonomous or non-autonomous vehicles, and/or within aviation or nautical contexts, as well as detecting and analyzing events in other software-based simulation contexts.

FIGS. 1-4 illustrate example processes in accordance with examples of the disclosure. These processes are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes. For example, some or all of the process(es) 100-400 may be performed by one or more components in FIG. 5, as described herein. For example, some or all of the process(es) 100-400 may be performed by the scenario component 538, the parameter component 540, the emulation component 542, the contour component 544, the probability component 546, and/or the scenario/vehicle performance component 548.

FIG. 1 depicts an example process 100 of generating a surrogate model associated with a simulation parameter space, determining a contour around a region of interest of the simulation parameter space, and determining a vehicle safety metric associated with an autonomous vehicle controller based on a probability that an evaluation of the surrogate model will return a result that corresponds to a parameter being associated with the region of interest. Some or all of the operations in process 100 may be performed by components of a simulation system, an emulation system, and/or computing devices, described below in more detail.

As noted above, the techniques described herein relate generally to executing and evaluating simulations based on scenarios and/or evaluating surrogate models determined based on evaluating the simulations. A scenario may refer to a defined environment in which a simulation may be executed. For example, a driving scenario may correspond to a particular driving environment through which a vehicle may traverse and may include other vehicles and/or other static or dynamic objects with which the vehicle may interact. In some cases, driving scenarios may be based on log data collected by a real (or simulated) vehicles traversing through real (or simulated) environments. Such scenarios may comprise substantially similar (e.g., within technical tolerances) representations of the previously captured scenario from a log, perturbations thereof, or scenarios derived therefrom (e.g., representative scenarios determined from a plurality of scenarios). Driving scenarios may include, as non-limiting examples, intersection scenarios, crosswalk scenarios, freeway merging scenarios, bumper-to-bumper traffic scenarios, parallel parking scenarios, and so on.

An evaluation system may use driving scenarios to test and validate autonomous vehicle controllers and/or other components of the simulated autonomous vehicle as may be contemplated (e.g., braking capacity, energy dissipation, etc.). Each unique driving scenario may be stored as scenario data that defines a driving simulation environment (e.g., map data, road configurations and interactions, lighting conditions, weather conditions, traffic signs and signals, etc.), as well as the static and/or dynamic objects to be rendered in the simulation environment. Within a simulation based on a driving scenario, a simulated vehicle instantiated and controlled by an autonomous vehicle controller may traverse the driving simulation environment, and may encounter and react to dynamic objects (e.g., vehicles, pedestrians, animals, bicycles, etc.) and/or static objects (e.g., buildings, signage, parked vehicles, and the like) within the simulated environment.

The scenario data associated with a driving scenario may include a set of base (or default) parameters for the simulated vehicle and/or any other objects in the scenario. For example, for any vehicle and/or other object in a driving scenario, the scenario data may define base parameters (which also may be referred to as attributes) for the position (e.g., x, y, and/or z coordinates), orientation (e.g., a roll, pitch, yaw), velocity, acceleration, pose, and/or extent (or size) of the vehicle or object. Additionally, or alternatively, the scenario data may include a set of base parameters indicating a number of objects in a driving scenario, types of the objects in the driving scenario, scene elements associated with the driving scenario (e.g., buildings, roadways, stoplights, etc.) and/or a type of scene element associated with the driving scenario. Of course, any other parameter which defines a state of the vehicle is contemplated.

Additionally, in some examples a driving scenario may include scenario parameters that can be configured to modify (or perturb) the base parameters of a vehicle or object in the scenario, in order to introduce variation and inconsistency into the simulations executed based on the scenario. A scenario parameter associated with a parameter of a vehicle or other object in a scenario may be used to perturb the parameter from its base value to a perturbed value. Scenario parameters can increase or decrease base parameter values, by an absolute amount or by a percentage. In some examples, the scenario parameters may be determined from the base parameter values using parameter ranges and/or distributions associated with the corresponding object/vehicle parameters. For example, for an object in a scenario traveling at a speed of 10 meters per second (m/s), a parameter range of +/−40% associated with the velocity of the object may result in parameters ranging from −4 m/s to +4 m/s, and perturbed velocity values ranging between 6 m/s and 14 m/s for the object. Additionally, parameters may be determined based on distributions associated with their respective object parameters, in which the distributions determine the likelihood of different parameter values within the range. Continuing the above example, if the velocity parameter for a scenario object is defined by a normal distribution, then by sampling from the normal distribution the parameter values near the center of the distribution (e.g., 0) m/s) may be more likely than the parameter values near the tails of the distribution (e.g., −4 m/s and +4 m/s). Therefore, when sampling from the normal distribution defined for the object velocity, perturbed velocities closer to the base parameter value (e.g., 10 m/s) may be observed more often than perturbed velocities closer to the boundaries of the parameter range (e.g., 6 m/s and 14 m/s).

Although the above example describes using a parameter range and/or distribution to determine parameter values for perturbing the velocity of an object in a scenario, in other examples parameter ranges and/or distributions may be used to determine parameter values associated with any other parameter of a vehicle or other object within a scenario. In some cases, a parameter of an object in a scenario (e.g., an object position, extent, pose, velocity, acceleration, etc.) may have a unique parameter range and/or distribution defined for that parameter. Additionally, or alternatively, a scenario may use the same parameter ranges and/or distributions for the same parameters and/or the same types of objects. For instance, in a scenario all vehicle objects may be assigned the same size parameter ranges (e.g., +/−N %) and similar distribution curves, the same position parameter ranges (e.g., +/−N meters) and similar distribution curves, the same acceleration parameter ranges and similar distribution curves, and so on for each different object type/classification. Additional parameters may control, for example, a number of objects, types of objects, characteristics of a map (e.g., lane widths, speed limits, etc.), or any other representation for reproducing an interaction of the autonomous vehicle in an environment.

When an evaluation system executes a simulation based on a driving scenario, it may use the base parameter values for the objects in the scenario, and/or may use object parameter values perturbed using scenario parameters. For example, for a scenario parameter associated with a particular parameter of a particular object in the scenario, a parameter component can determine a parameter value and/or percentage associated with the parameter. When executing the simulation, a simulation component may instantiate and simulate the responses of the autonomous vehicle controller to the simulated environment, including simulated vehicles and/or objects having perturbed parameters based on their respective scenario parameters. As noted above, the scenario parameters for an object parameter in a scenario may be based on a parameter range and/or distribution for the object parameter. In some cases, the parameter ranges and/or distributions may be based on perception error models associated with the object parameters. Such error models may be represented by, without limitation, look-up tables determined based on statistical aggregation using ground-truth data, functions (e.g., errors based on input parameters), or any other model which maps a parameter to a particular error. In at least some examples, such error models may map particular errors with probabilities/frequencies of occurrence. For example, details of using error models and/or distributions to evaluate risk or probability of collisions are discussed in U.S. application Ser. No. 16/862,693, filed on Apr. 30, 2020, and titled "Constructing Vehicle Operation Based on Uncertainty in Perception and/or Prediction," which is herein incorporated by reference in its entirety and for all purposes.

A parameterized scenario may refer to scenario in which one or more parameters of the vehicles/objects in the scenario has been perturbed based on a parameter associated with the parameter. Parameterized scenarios can be generated based on an initial (or based) driving scenario, by determining a set of parameter values that can be used to perturb one or more object parameters of the base scenario. Parameterized scenarios can provide a set of variations of the base scenario, by determining multiple parameter sets to efficiently cover a wide range of variations of the scenario without requiring a manual enumeration of the variations. Additionally, based at least in part on executing the parameterized scenarios, simulation data (e.g., simulation results) can indicate how the autonomous vehicle controller responded to (or will respond to) the various parameterized scenarios and determine a successful outcome or an unsuccessful outcome based at least in part on the simulation data.

Additionally, an emulation component may be employed to bypass execution of the expensive-to-evaluate simulation component executed by the evaluation system. As previously mentioned, an emulation component may include a surrogate model configured to approximate the functionality of a simulation model. The surrogate model may be determined using a threshold amount of simulation results, such that the surrogate model may be constructed to include the main features of the simulation model. In some examples, a subset of points in a simulation parameter space may be simulated either at random, or by intelligently simulating points that will yield the most useful results. Once constructed, queries may be performed on the surrogate model without incurring the compute cost of directly simulating such scenarios. For example, a single simulation may take up to 5 minutes, which leads to compute, time, and other constraints when simulating tens of thousands of single scenarios. However, by simulating a small subset of the scenarios, such as, 500 scenarios out of tens of thousands of candidate scenarios, for example, enough data can be gathered to train the surrogate model how the simulation model behaves in certain areas of a parameter space. The results of the remaining scenarios may then be emulated by the surrogate model instead of the expensive-to-evaluate simulation model.

In some cases, the simulation results and/or emulation results for a set of parameterized scenarios can be aggregated to provide safety metrics associated with the autonomous vehicle controller and/or the parameterized scenario. For example, the resulting data can indicate a success rate and/or a failure rate of the autonomous vehicle controller with respect to the parameterized scenario. In some instances, meeting or exceeding a success rate can indicate a successful validation of the autonomous vehicle controller which can subsequently be downloaded by (or otherwise transferred to) a vehicle for further vehicle control and operation.

Within process 100, at operation 102 an evaluation system may receive, identify, or otherwise determine a first set of parameters of a simulation parameter space. In some examples, the simulation parameter space may be associated with simulating and/or emulating an autonomous vehicle controller.

An example 104 illustrates a parameter space 106 including a first set of parameters 108 associated with simulating and/or emulating an autonomous vehicle controller. In some examples, the first set of parameters 108 may be initialized at random, initialized based on a threshold parameter of interest, and/or initialized based on a previous surrogate model generated for the parameter space 106. For example, the first set of parameters 108 may be selected systematically or at random, to provide the algorithm with sufficient known of the underlying system to be emulated. As noted above, each scenario parameter may represent a parameter value (e.g., an extent value, position value, pose value, velocity value, acceleration value, etc.) for an object within the driving scenario. The evaluation system then may execute the parameterized driving scenario to determine a simulation result, an emulation result, and/or outcome. For example, scenario parameters may control the initial position, speed, trajectory, acceleration, and/or pose of a simulated vehicle, a pedestrian, and/or any other objects in a simulated environment. Multiple parameter sets may be used to execute multiple simulations and/or emulation using different combinations of the object parameters, such as different speeds, positions, and trajectories within the parameter ranges for each parameter and for each object. In some examples, a simulation result may be a distance between the simulated autonomous vehicle controller and an object in an environment. That is, given a set of initial conditions of a simulated autonomous vehicle controller and another object, the simulation result can be a binary indication of whether a collision or near-collision occurred and/or the final distance between the two objects.

Although the example parameter space 106 is illustrated as a two-dimensional (2D) parameter space, any number of parameters may be contemplated with respect to the process(es) described herein. That is, in some examples, the parameter space 106 may comprise any number of dimensions.

At operation 110, the process 100 may include generating a surrogate model 112 associated with the parameter space. In some examples, the operation 110 may include evaluating the first set of parameter values using a simulation component of the evaluation system. The results of evaluating the first set of parameters 108 in the parameter space 106 may be used to train a surrogate model 112 that is configured to emulate the simulation component that was used to evaluate the first set of parameters 108. For example, and as previously mentioned, the surrogate model 112 may be determined by intelligently simulating points in the parameter space 106 with the simulator until there is enough simulation results to build the surrogate (approximating) model 112 while capturing the main features of the simulation model. Once constructed, queries may be performed on the surrogate model 112 without incurring the compute cost of directly simulating such scenarios. Additionally, or alternatively, the results of the scenarios that have been emulated by the surrogate model 112 (the emulation results) may be validated by evaluating the scenarios using the simulation model and comparing those simulation results with the emulation results.

At operation 114, the process 100 may include determining and/or identifying additional parameters of the parameter space 106. In some examples, such additional parameters may be associated with a particular outcome of interest, such as, for example, a collision between a simulated vehicle controlled by the autonomous vehicle controller and simulated object of the parameterized driving simulation. In some examples, such a particular outcome of interest may correspond to a particular region of interest in the parameter space 106, and thus, exploring the region of interest may lead to a more desirable result and/or a more efficient evaluation of the parameter space 106.

An example 116 illustrates the parameter space 106 including a second set of parameters 118 associated with simulating and/or emulating an autonomous vehicle controller. As previously mentioned, the second set of parameters 118 may be associated with a particular outcome of interest and/or may correspond to a particular region of interest of the parameter space 106. For example, a parameterized scenario can be executed as a simulation and associated with an outcome indicating the minimum distance between a simulated vehicle and a simulated pedestrian during the simulation. A minimum distance of zero may indicate that the simulated vehicle contacted the simulated pedestrian during the simulation, representing a parameterized scenario failure, while a non-zero minimum distance may represent a successful parameterized scenario. In some examples, the region of interest may correspond to a threshold result associated with the parameterized scenario failure described above.

In some examples, the evaluation system may use a Bayesian optimization technique to determine the second set of parameters 118 associated with the region of interest of the parameter space 106. As previously described, when using a Bayesian optimization technique, the evaluation system initially may select one or more sets of scenario parameters during an initialization phase of the Bayesian algorithm (e.g., the first set of parameters 108). The scenario parameter sets selected during the initialization phase may be selected systematically or at random, to provide the algorithm with sufficient knowledge of the underlying system to be emulated.

After the initialization phase the Bayesian algorithm may use non-random techniques to select parameter sets (e.g., the second set of parameters 118) associated with the region of interest. In some examples, selection of such parameter sets may be iteratively executed by the Bayesian optimization algorithm. Additionally, or alternatively, such selection may be performed in parallel. After each driving simulation is executed the simulation system may provide the simulation results (e.g., pass or fail) and/or outcome(s) for the parameterized scenario (e.g., minimum distance between the simulated vehicle and object during the simulation) to a non-sampling parameter selection component configured to implement a Bayesian optimization algorithm. The parameter selection component may use Bayesian optimization to determine parameter sets for subsequent simulations of the driving scenario.

Although certain examples described herein use a Bayesian optimization algorithm and/or an acquisition function to select parameter sets, in other examples other machine learning algorithms configured for black box optimization may be used instead of or in addition to Bayesian optimization, such as, for example, active learning algorithms, an efficient global reliability analysis, an efficient global inversion, or the like.

At operation 120, the process 100 may include further evaluation, analysis, and/or selection of the parameters of the parameter space 106. In some examples, the selection of the parameter sets may be determined by an acquisition function configured exploit the multidimensional parameter space of the scenario. Additionally, or alternatively, the selection of the parameter sets may be determined using the Bayesian optimization techniques to explore the multidimensional parameter space of the scenario. In this example, exploring the parameter space may refer to selecting parameter sets with a high level of uncertainty of the simulation outcome(s). For instance, during exploration the Bayesian optimization algorithm may select parameter sets far from the parameter sets of previously executed simulations within the parameter space, to escape any local maxima/minima and determine simulation outcome(s) for other regions of the parameter space. In contrast, exploiting the parameter space may refer to selecting parameter sets with high likelihood of identifying a parameterized scenario failure (e.g., parameter sets corresponding to the particular region of interest of the parameter space 106). For instance, during exploitation the acquisition function may select a parameter set near another parameter set used in a simulation that had a low minimum distance between the simulated vehicle and object (e.g., a near-miss collision). In other words, parameter selection based on exploitation may use the parameter sets of existing scenario failures and/or near failures, to maximize the probability of selecting other points in the parameter space that correspond to scenario failures.

An example 122 illustrates the parameter space 106 and a contour 124 associated with the region of interest defined at least partially by the second set of parameters 118. As illustrated, the second set of parameters 118, and/or any other number of additional sets of parameters, determined by the Bayesian optimization may correspond to, or otherwise delineate the contour 124. In some examples, an initial contour 124 may be determined (e.g., a contour corresponding to the second set of parameters 118), and a further iterative evaluation of the acquisition function may update the contour 124 based on additional sets of parameters of the parameter space 106. Further, the acquisition function may utilize the second set of parameters 118 to identify one or more additional sets of parameters of the parameter space 106 to update the contour. While the example 122 only illustrates a single contour 124, multiple iterations of such a process, while adjusting the threshold value for the particular scenario of interest may result in the determination of various contours in the same parameter space 106. In such examples, the contours may be represented by rendering a heatmap on the parameter space 106.

In some examples, once a computational budget for the acquisition function has been exhausted, a threshold number of iterations has been reached, a change (e.g., contour boundaries, surrogate model, etc.) between iterations is less than or equal to a threshold change, and/or during each iteration of the evaluation, the contour 124 may be determined and/or further refined in association with the region of interest. For example, each iteration may return a set of results that correspond to parameters associated with the threshold value of the particular event of interest. That is, the threshold value associated with the particular event of interest may identify the contour (e.g., level set, excursion set, etc.). It should be noted that multiple contours may be determined, where each individual contour may represent a respective threshold value associated with the particular event of interest (e.g., the further the contour from the region of interest, the greater the threshold). As previously mentioned, with each iteration, the acquisition function may return more accurate results, thus updating the contour 124 with each result leading to a more accurate contour 124, yielding results having a higher level of certainty.

At operation 126, the process 100 may include evaluating the surrogate model 112 with respect to the contour 124. In some examples, once the simulation budget has been exhausted and/or the contour 124 is otherwise in place, a probability may be determined, the probability indicating a likelihood that an evaluation of the surrogate model 112 will return a result corresponding to a parameter being associated with the region of interest corresponding to the contour.

An example 128 illustrates the parameter space 106 including the contour 124. As previously mentioned, the evaluation system may determine a probability 130 that an evaluation of the surrogate model 112 will return a result corresponding to a parameter 132 being associated with the region of interest corresponding to the contour 124 (e.g., within the excursion set). In some examples, such a probability 130 may be determined by imposing a fine grid on the parameter space 106 and then quickly evaluating the underlying surrogate model 112. By performing a sufficient number of evaluations of the surrogate model 112, the results may be aggregated and/or otherwise analyzed to determine a probability 130 of the surrogate model 112 returning a result that corresponds to a parameter 132 being associated with the region of interest corresponding to the contour 124 of the parameter space 106.

At operation 134, the process may include determining a vehicle safety metric associated with the autonomous vehicle controller based at least partly on the probability 130 that an evaluation of the surrogate model 112 will return a result corresponding to a parameter 132 being associated with the region of interest corresponding to the contour 124. In some examples, the vehicle safety metric may be based at least in part on a probability model and/or exposure model and an evaluation of the probability 130 with respect to the exposure model. The probability may be further analyzed in the context of the particular event of interest to determine a vehicle safety metric associated with an autonomous vehicle controller. In some examples, the vehicle safety metric may represent the likelihood of a vehicle encountering an adverse event under control of the simulated autonomous vehicle controller. For example, the vehicle safety metric may correspond to a collision probability of operating a vehicle using the simulated autonomous vehicle controller. Examples of an adverse event may include scenarios such as a collision or near-collision between a vehicle under control of the simulated autonomous vehicle controller and a simulated object (e.g., a car, a pedestrian, a bicyclist, a building, etc.).

As illustrated by operations 102, 110, 114, 120, 126, and 134, process 100 describes a technique in which probability calculations are used to quantify the likelihood of events that occur infrequently during simulations and/or emulations. This technique may provide technical advantages when detecting events occurring infrequently during such simulations, and may improve the probability calculations used to quantify the likelihood of such events, both by reducing the amount of computing resources required by the simulation system, and by improving the accuracy of the performance metrics (e.g., a collision metric, vehicle safety metric, etc.) associated with the driving scenario, thereby improving the safety of autonomous vehicles in operation.

The technical advantages and improvements provided by the techniques described herein are based in part on the greater degree of uncertainty of simulation results based on parameterized scenarios within the simulation region. As described herein, an optimization function (e.g., Bayesian optimization) may be employed to identify parameters (e.g., the second set of parameters 118) associated with a region of interest of the parameter space 106 and determine the contour 124, and various examples described herein may have improved success rates for detecting infrequent events during simulations. Additionally, by intelligently simulating a sufficient subset of points (e.g., until there is enough simulation results to build the surrogate model 112 while capturing the main features of the simulation model) in a simulation parameter space 106, a significant amount of time and computational resources may be saved by evaluating the surrogate model 112 rather than evaluating tens of thousands of costly simulations with a brute force method. Further, employing the optimization function in combination with the surrogate model 112 may result in less computationally expensive evaluations that increase in accuracy with each subsequent evaluation, since the acquisition function may use previous results as at least partial input for a subsequent evaluation.

Figure 2:
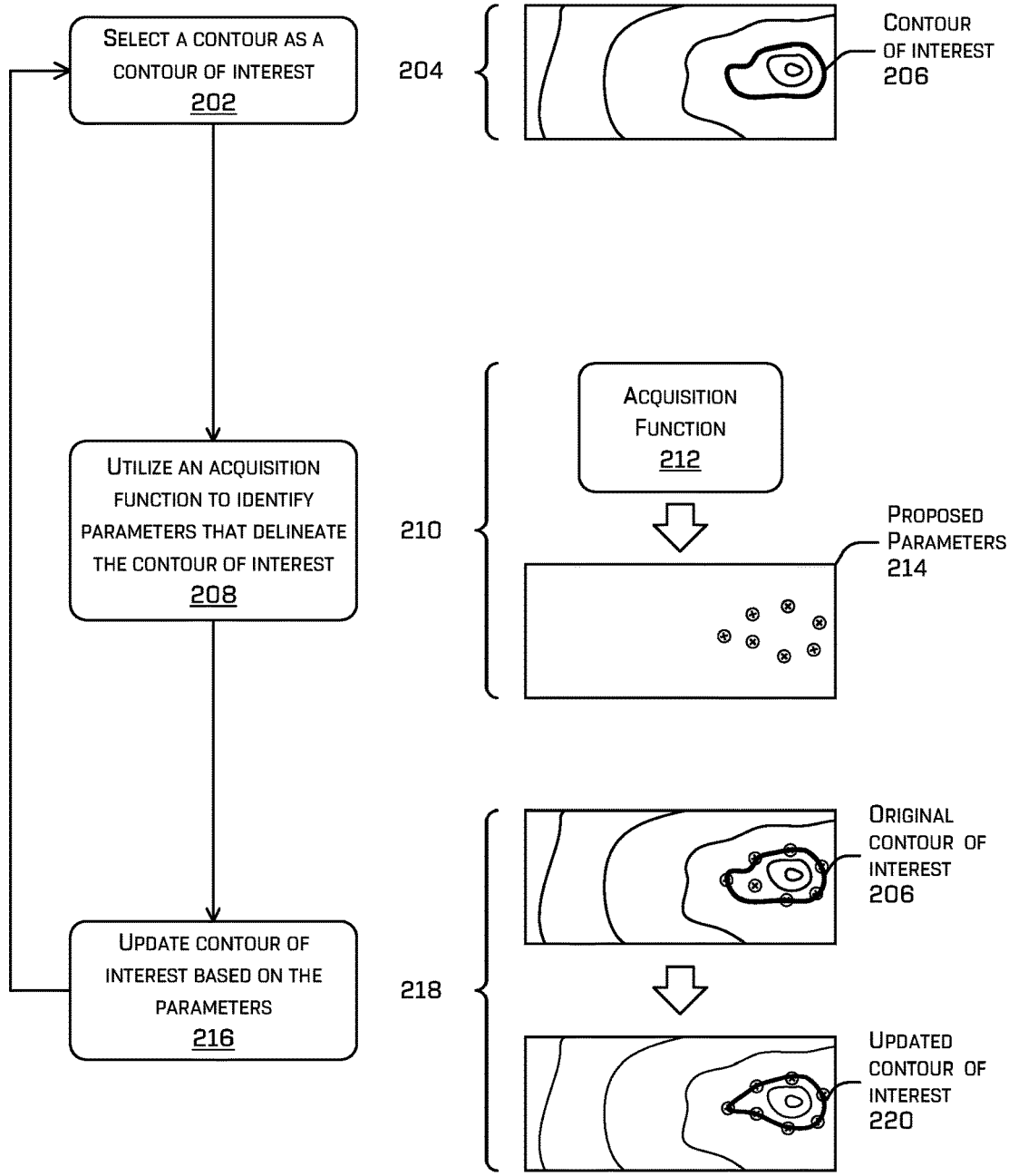
FIG. 2 illustrates a pictorial flow diagram of an example process of using an acquisition function to update a contour of interest by identifying parameters that delineate the contour of interest.

FIG. 2 illustrates a pictorial flow diagram of an example process 200 of using an acquisition function to update a contour of interest by identifying parameters that delineate the contour of interest.

At operation 202, the process 200 may include selecting a contour associated with a parameter space as a contour of interest. In some examples, a threshold value corresponding to the contour may be identified and used to delineate the contour for evaluation.

An example 204 illustrates a parameter space 106 having multiple contours, including the contour of interest 206. In some examples, the contour of interest 206, or a threshold value corresponding to the contour of interest 206 may be identified. The contour of interest 206 and/or the threshold value corresponding to the contour of interest 206 may then be used as an input to an optimization function and/or an acquisition function associated with the optimization function.

At operation 208, the process 200 may include identifying parameters that delineate the contour of interest 206. In some examples, identifying the parameters that delineate the contour of interest 206 may be achieved using an optimization function and/or an acquisition function. For example, an optimization function may be configured to identify the parameters that delineate a most inner contour, whereas an acquisition function may be configured to identify parameters that delineate a contour associated with a threshold value of interest. As previously mentioned, the contour of interest 206 and/or the threshold value corresponding to the contour of interest 206 may be used as an input to an acquisition function configured to propose parameters that further delineate the contour of interest 206.

An example 210 illustrates that an acquisition function 212 may be utilized to identify parameters that delineate the contour of interest 206, such as, proposed parameters 214. The acquisition function may use non-random techniques to identify and/or select the proposed parameters 214 associated with the contour of interest. In some examples, the selection of the proposed parameters 214 may be determined by the acquisition function to exploit the multidimensional parameter space of the scenario, by selecting parameters associated with the threshold value corresponding to the contour of interest 206.

Although certain examples described herein use a Bayesian optimization algorithm and/or an acquisition function to select proposed parameters 214, in other examples other machine learning algorithms configured for black box optimization may be used instead of or in addition to Bayesian optimization and/or an acquisition function.

At operation 216, the process 200 may include updating the contour of interest 206. The contour of interest 206 may be updated following each iteration of the process 200. Additionally, or alternatively, the proposed parameters 214 may delineate the contour of interest 206, and an updated contour may closely correspond to the original contour.

An example 218 illustrates the original contour of interest 206 and an updated contour of interest 220 based on the proposed parameters 214 identified by the acquisition function. As illustrated, the original contour of interest 206 may have one or more disparities from the proposed parameters 214. Since the acquisition function uses prior results at least partially as input, an accuracy of the contours increases with evaluation(s) of the function. As such, this original contour of interest 206 may then be updated based on the proposed parameters 214. It can be seen in the example 218 that the original contour of interest 206 has been updated to the updated contour of interest 220, which more closely corresponds to the proposed parameters 214.

In some examples, the process 200 may then start over at operation 202, where a contour of interest 206 is again selected. In some examples, the same contour of interest 206 may be selected or an additional contour of interest 206 may be evaluated. Additionally, or alternatively, the process 200 may be iteratively executed and/or performed in parallel. As subsequent iterations of the process 200 are performed, a more accurate contour may be determined, thus yielding a higher accuracy with respect to the vehicle safety metric that is determined by evaluating the surrogate model 112 as described with respect to FIG. 1.

Figure 3:
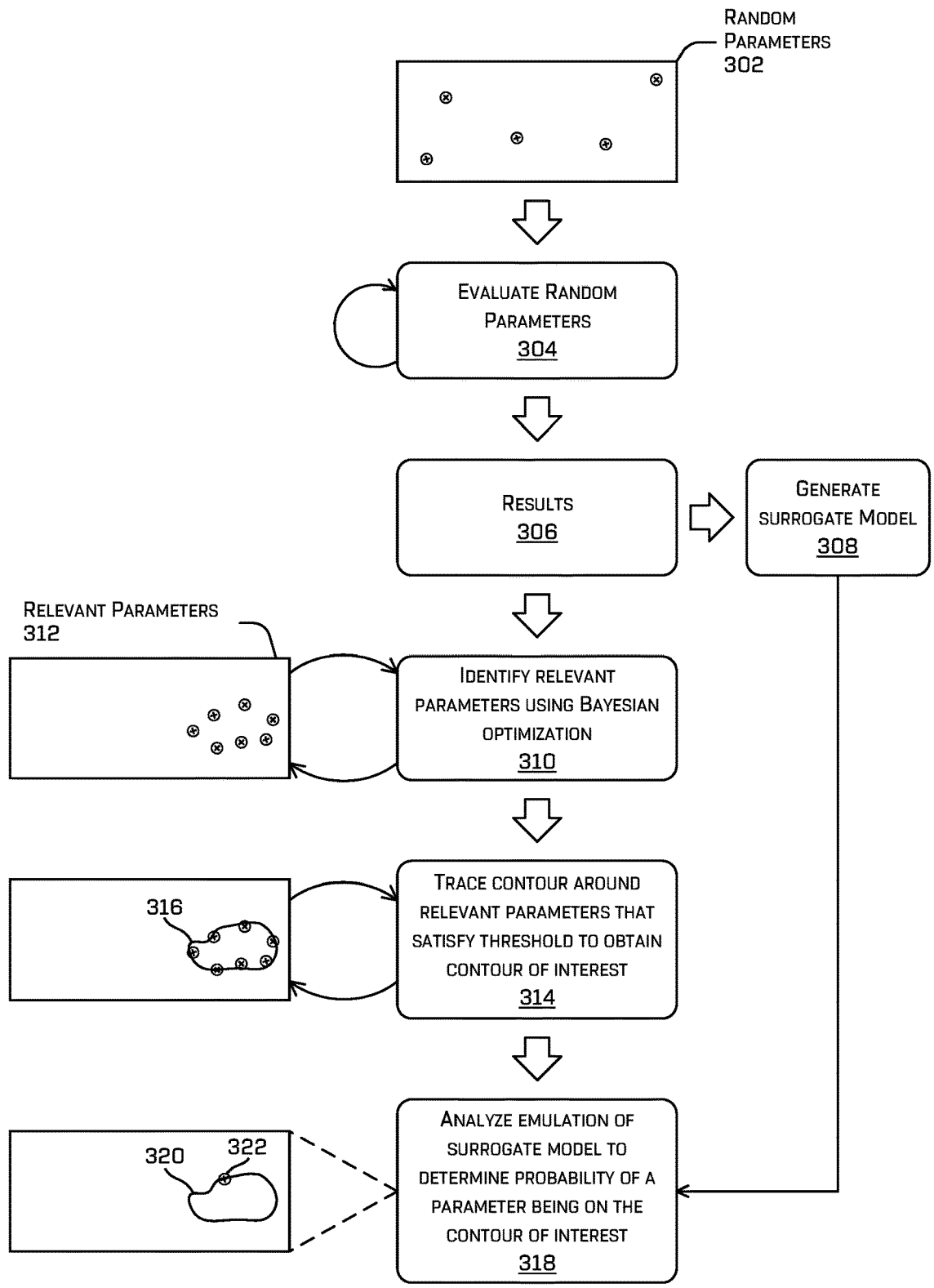
FIG. 3 illustrates a flow diagram of an example process of determining a surrogate model using results generated by an evaluation of random parameters of a parameter space, tracing a contour around relevant parameters identified using an acquisition function, and analyzing an emulation of the surrogate model to determine a probability of returning a result corresponding to a parameter located on the contour.

FIG. 3 illustrates a flow diagram of an example process 300 of determining a surrogate model using results generate by an evaluation of random parameters of a parameter space, tracing a contour around relevant parameters identified using an acquisition function, and analyzing an emulation of the surrogate model to determine a probability of returning a result corresponding to a parameter located inside the contour.

At 304, the process 300 may include evaluating random parameters 302 of a parameter space. In some examples, a parameter space associated with a simulating an autonomous vehicle controller may be defined and sets of parameters within the parameter space may be evaluated. In some examples, various sets of random parameters 302 may be evaluated iteratively. Additionally, or alternatively, various sets of random parameters 302 may be evaluated in parallel.

At 306, the process 300 may include receiving results associated with the evaluation(s) of the random parameters 302. In some examples, operation 304 may be performed until a sufficient amount of results are accrued to determine a surrogate model, associated with the parameter space, and configured to emulate the simulation of the autonomous vehicle controller that was used to evaluate the random parameters 302.

At 308, the process 300 may include generating a surrogate model associated with the parameter space. In some examples, the surrogate model may be determined based on an evaluation of parameters of the parameter space selected at random. For example, the surrogate model may be determined once there is enough simulation results from the evaluation of the random parameters 302 to build the surrogate model that captures the main features of the simulation model used. Once constructed, queries may be performed on the surrogate model without incurring the compute cost of directly simulating such scenarios.

At 310, the process 300 may include identifying relevant parameters 312 using Bayesian optimization. For example, such relevant parameters 312 may be associated with a particular outcome of interest, such as, for example, a collision between a simulated vehicle controlled by the autonomous vehicle controller and simulated object of a parameterized driving simulation. In some examples, such a particular outcome of interest may correspond to a particular region of interest in the parameter space, and thus, exploring the region of interest may lead to a more desirable result and/or a more efficient evaluation of the parameter space.

The Bayesian algorithm may use non-random techniques to select relevant parameters 312 associated with the region of interest. In some examples, selection of such relevant parameters may be iteratively executed by the Bayesian optimization algorithm. Additionally, or alternatively, such selection may be performed in parallel. After each driving simulation is executed the simulation system may provide the simulation results (e.g., pass or fail) and/or outcome(s) for the parameterized scenario (e.g., minimum distance between the simulated vehicle and object during the simulation) to a non-sampling parameter selection component configured to implement a Bayesian optimization algorithm. The parameter selection component may use Bayesian optimization to determine parameter sets for subsequent simulations of the driving scenario.

At 314, the process 300 may include tracing and/or determining a contour 316 around the relevant parameters 312. In some examples, an acquisition function may be employed to identify a subsequent set of relevant parameters 312. In some examples, operation 314 may be iteratively performed until a threshold number of executions and/or a threshold level of accuracy is achieved. Once the threshold has been satisfied, the contour of interest 316 may be identified. In some examples, operation 314 may include any number of the operations of process 200 described with respect to FIG. 2.

At 318, the process 300 may include analyzing an emulation of the surrogate model to determine a probability of an execution of the surrogate model resulting in a parameter being on or sufficiently close to the contour of interest. In some examples, the probability may be leveraged to determine a vehicle safety metric associated with the autonomous vehicle controller. For example, the probability may be further analyzed in the context of the particular event of interest to determine the vehicle safety metric associated with an autonomous vehicle controller. In some examples, the vehicle safety metric may represent the likelihood of a vehicle encountering an adverse event under control of the simulated autonomous vehicle controller. For example, the vehicle safety metric may correspond to a collision probability of operating a vehicle using the simulated autonomous vehicle controller.

Figure 4:
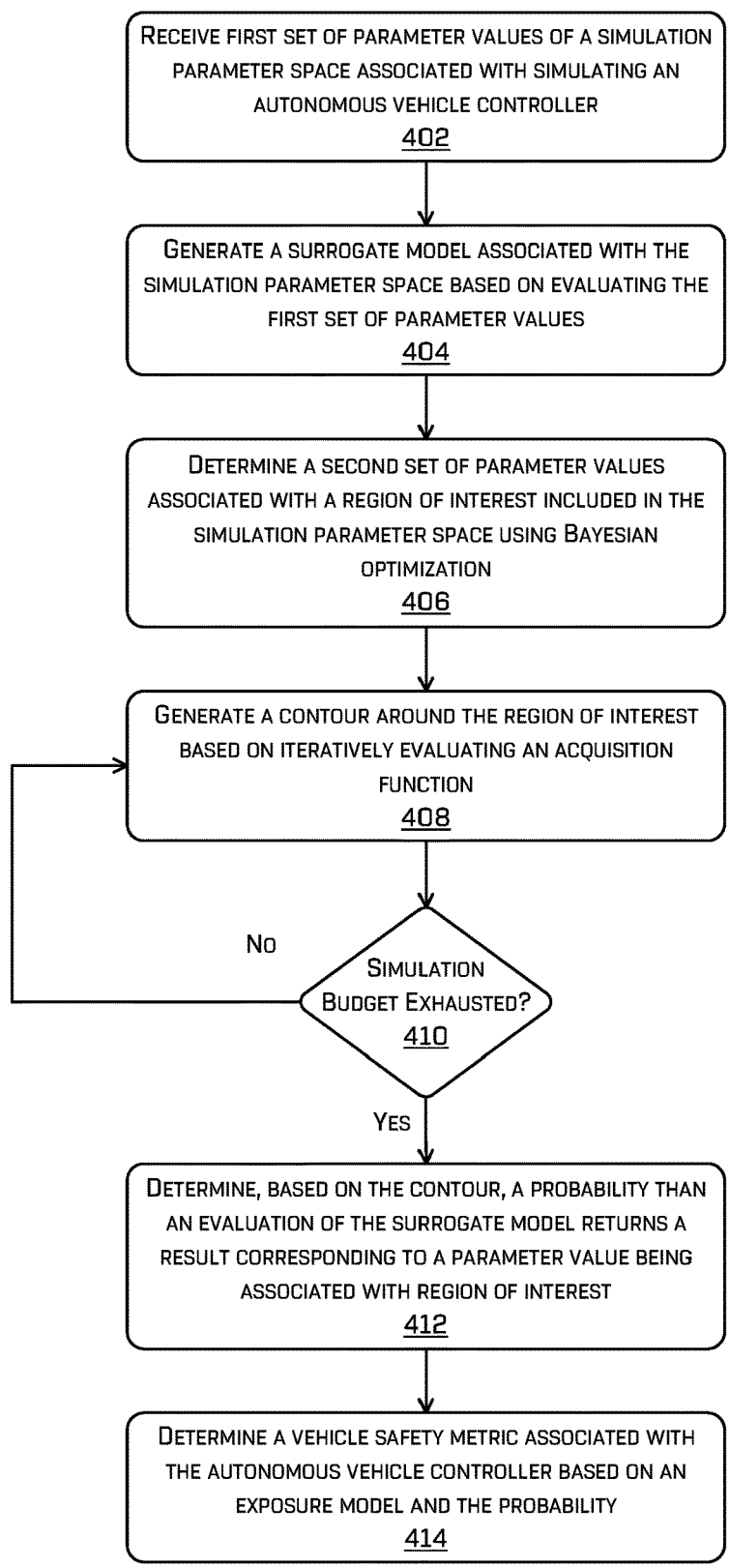
FIG. 4 illustrates a flow diagram of an example process of generating a surrogate model and determining a vehicle safety metric associated with an autonomous vehicle controller based on a probability that an evaluation of the surrogate model will return a result that corresponds to a parameter being associated with the region of interest corresponding to a contour.

FIG. 4 illustrates a flow diagram of an example process 400 of generating a surrogate model based on an evaluation of a first set of parameter values of a simulation parameter space, determining a contour around a second set of parameter values associated with a region of interest of the simulation parameter space, and determining a vehicle safety metric associated with an autonomous vehicle controller based on a probability that an evaluation of the surrogate model will return a result that corresponds to a parameter value being associated with the region of interest corresponding to the contour.

At 402, the process 400 may include receiving a first set of parameter values of a simulation parameter space associated with simulating an autonomous vehicle controller. In some examples, the first set of parameter values may be associated with a region of interest. In some examples, the first set of parameter values may be initialized at random, initialized based on a threshold parameter of interest, and/or initialized based on a previous surrogate model generated for the parameter space. For example, the first set of parameter values may be selected systematically or at random, to provide the algorithm with sufficient known of the underlying system to be emulated. In some examples, the first set of parameter values may correspond to the first set of parameters 108 as described with respect to FIG. 1.

At 404, the process 400 may include generating, based at least in part on evaluating the first set of parameter values, a surrogate model associated with the simulation parameter space. The results of evaluating the first set of parameter values in the parameter space may be used to train a surrogate model that is configured to emulate the simulation component that was used to evaluate the first set of parameter values. For example, and as previously mentioned, the surrogate model may be constructed to capture the main features of the simulation model. Once constructed, queries may be performed on the surrogate model without incurring the compute cost of directly simulating such scenarios. Additionally, or alternatively, the results of the scenarios that have been emulated by the surrogate model (the emulation results) may be validated by evaluating the scenarios using the simulation model and comparing those simulation results with the emulation results In some examples, the surrogate model may correspond to the surrogate model 112 as described with respect to FIG. 1.

At 406, the process 400 may include determining a second set of parameter values of the simulation parameter space. In some examples, determining the second set of parameters using Bayesian optimization and based at least in part on the first set of parameters. In some examples, the second set of parameter values may be associated with the region of interest. In some examples, the second set of parameter values may be associated with a particular outcome of interest, such as, for example, a collision between a simulated vehicle controlled by the autonomous vehicle controller and simulated object of the parameterized driving simulation. In some examples, such a particular outcome of interest may correspond to a particular region of interest in the parameter space, and thus, exploring the region of interest may lead to a more desirable result and/or a more efficient evaluation of the parameter space. In some examples, the second set of parameter values may correspond to the second set of parameters 118 as described with respect to FIG. 1.

At 408, the process 400 may include determining a contour around the region of interest. In some examples, determining the contour may be based at least in part on iteratively evaluating an acquisition function. In some examples, the acquisition function may be associated with the Bayesian optimization. Additionally, or alternatively, the acquisition function may be configured to identify parameters that delineate the contour around the region of interest. In some examples, an initial contour may be determined (e.g., a contour corresponding to the second set of parameter values), and a further iterative evaluation of the acquisition function may update the contour based on additional sets of parameter values of the parameter space. Further, the acquisition function may utilize the second set of parameter values to identify one or more additional sets of parameter values of the parameter space to update the contour. In some examples, the contour may correspond to the contour 124 as described with respect to FIG. 1.

At 410, the process 400 may include determining if the simulation budget has been exhausted. By way of example, the operation 410 may include determining that the simulation budget has been exhausted (e.g., the acquisition function has been evaluated a threshold number of times and/or a sufficient amount of results have been collected). By way of another example, the operation 410 may include determining that the simulation budget has not been exhausted (e.g., the acquisition function has not been evaluated a threshold number of times and/or a sufficient amount of results have not been collected). The process may subsequently include the operation 408 to restart a portion of the process 400, based on determining that the simulation budget has not been exhausted.

At 412, the process 400 may include determining a probability that an evaluation of the surrogate model will return a result corresponding to a parameter value being associated with the region of interest corresponding to the contour. In some examples determining the probability may be based at least in part on a probability model and/or an exposure model and the contour. In some examples, such a probability may be determined by imposing a fine grid on the parameter space and then quickly evaluating the underlying surrogate model. By performing a sufficient number of evaluations of the surrogate model, the results may be aggregated and/or otherwise analyzed to determine a probability of the surrogate model returning a result that corresponds to a parameter being associated with the region of interest and/or located on the contour of the parameter space.

At 414, the process 400 may include determining a vehicle safety metric associated with the autonomous vehicle controller. In some examples, determining the vehicle safety metric may be based at least in part on the probability. The probability may be further analyzed in the context of the particular event of interest to determine the vehicle safety metric associated with an autonomous vehicle controller. In some examples, the vehicle safety metric may represent the likelihood of a vehicle encountering an adverse event under control of the simulated autonomous vehicle controller. For example, the vehicle safety metric may correspond to a collision probability of operating a vehicle using the simulated autonomous vehicle controller. Examples of an adverse event may include scenarios such as a collision or near-collision between a vehicle under control of the simulated autonomous vehicle controller and a simulated object (e.g., a car, a pedestrian, a bicyclist, a building, etc.).

Additionally, or alternatively, the process 400 may further include determining an updated contour associated with the region of interest. In some examples, determining the updated contour may be based at least in part on the contour and a second evaluation of the acquisition function.

In some examples, the contour may be associated with a threshold result. Additionally, or alternatively, the result corresponding to the parameter value may satisfy the threshold result.

In some examples, the first set of parameter values and/or the second set of parameter values may comprise at least one of a position of a vehicle associated with the autonomous vehicle controller, an orientation of the vehicle, a velocity of the vehicle, an acceleration of the vehicle, a pose of the vehicle, a signal associated with the vehicle (e.g., a turn signal, an emergency signal, etc.), a level of friction between the vehicle surface on which the vehicle resides, a behavior classification associated with the vehicle (e.g., aggressive, timid, unpredictable, etc.), a perception error associated with the vehicle (e.g., an improper perception of a scene and/or entity from the vehicle perspective), a pose error associated with the vehicle (e.g. the actual pose of the vehicle differentiates from the believed pose of the vehicle), and/or a size of the vehicle.

In some examples, the first set of parameter values are one of initialized at random or initialized based at least in part on an additional surrogate model.

Figure 5:
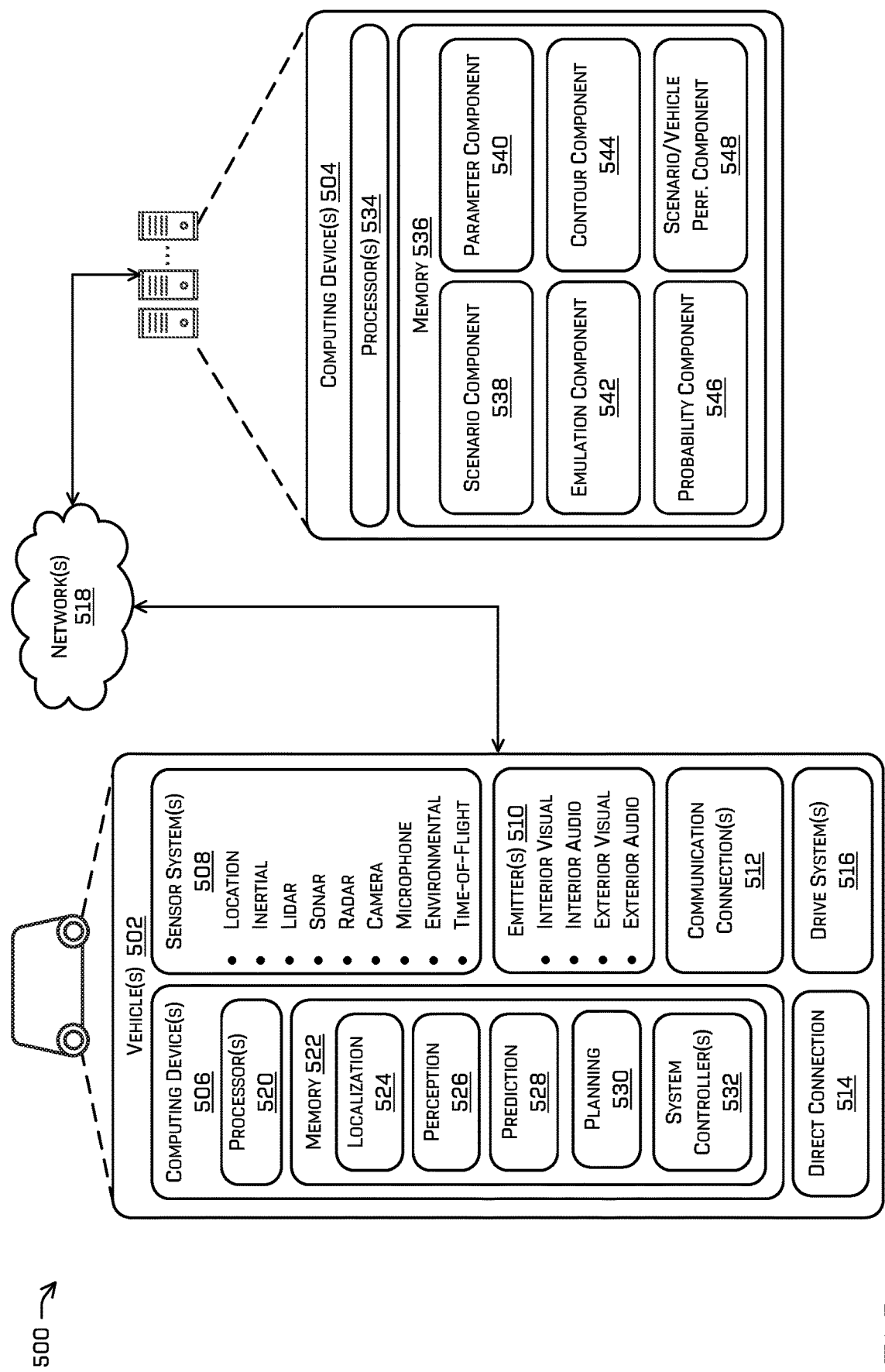
FIG. 5 depicts a block diagram of an example system for implementing various techniques described herein.

FIG. 5 depicts a block diagram of an example system 500 for implementing the techniques discussed herein. In at least one example, the system 500 can include one or more vehicles 502, and one or more computing devices 504. In some examples, the computing devices 504 may correspond to an autonomous vehicle simulation system configured to communicate with vehicle(s) 502 to generate, execute, and evaluate driving simulations. The vehicle(s) 502 may include various software-based and/or hardware-based components of autonomous vehicles, and may be used to control autonomous vehicles traversing through physical environments and/or simulated vehicles operating within driving simulations. In some cases, the vehicle(s) 502 may correspond to a vehicle traversing a physical environment, capturing and storing log data which may be provided to a simulation system. Additionally, or alternatively, the vehicle(s) 502 may correspond to a simulated vehicle operating within a driving simulation, as one or more separate vehicle control systems, interacting with and being evaluated by a simulation system during a driving simulation.

In at least one example, the vehicle 502 may correspond to an autonomous or semi-autonomous vehicle configured to perform object perception and prediction functionality, route planning and/or optimization. The example vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle(s) 502 can include a computing device(s) 506, one or more sensor system(s) 508, one or more emitter(s) 510, one or more communication connection(s) 512 (also referred to as communication devices and/or modems), at least one direct connection 514 (e.g., for physically coupling with the vehicle(s) 502 to exchange data and/or to provide power), and one or more drive system(s) 516. The one or more sensor system(s) 508 can be configured to capture sensor data associated with an environment.

The sensor system(s) 508 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 508 can include multiple instances of each of these or other types of sensors. For instance, the time-of-flight sensors can include individual time-of-flight sensors located at the corners, front, back, sides, and/or top of the vehicle(s) 502. As another example, the camera sensors can include multiple cameras disposed at various locations about the exterior and/or interior of the vehicle(s) 502. The sensor system(s) 508 can provide input to the computing device(s) 506.

The vehicle(s) 502 can also include one or more emitter(s) 510 for emitting light and/or sound. The one or more emitter(s) 510 in this example include interior audio and visual emitters to communicate with passengers of the vehicle(s) 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 510 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle(s) 502 can also include one or more communication connection(s) 512 that enable communication between the vehicle(s) 502 and one or more other local or remote computing device(s) (e.g., a remote teleoperations computing device) or remote services. For instance, the communication connection(s) 512 can facilitate communication with other local computing device(s) on the vehicle(s) 502 and/or the drive system(s) 516. Also, the communication connection(s) 512 can allow the vehicle(s) 502 to communicate with other nearby computing device(s) (e.g., other nearby vehicles, traffic signals, etc.).

The communications connection(s) 512 can include physical and/or logical interfaces for connecting the computing device(s) 506 to another computing device or one or more external network(s) 518 (e.g., the Internet). For example, the communications connection(s) 512 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 512 may comprise the one or more modems as described in detail above.

In at least one example, the vehicle(s) 502 can include one or more drive system(s) 516. In some examples, the vehicle(s) 502 can have a single drive system 516. In at least one example, if the vehicle(s) 502 has multiple drive systems 516, individual drive systems 516 can be positioned on opposite ends of the vehicle(s) 502 (e.g., the front and the rear, etc.). In at least one example, the drive system(s) 516 can include one or more sensor system(s) 508 to detect conditions of the drive system(s) 516 and/or the surroundings of the vehicle(s) 502. By way of example and not limitation, the sensor system(s) 508 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 516. In some cases, the sensor system(s) 508 on the drive system(s) 516 can overlap or supplement corresponding systems of the vehicle(s) 502 (e.g., sensor system(s) 508).

The drive system(s) 516 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 516 can include a drive system controller which can receive and preprocess data from the sensor system(s) 508 and to control operation of the various vehicle systems. In some examples, the drive system controller can include one or more processor(s) and memory communicatively coupled with the one or more processor(s). The memory can store one or more modules to perform various functionalities of the drive system(s) 516. Furthermore, the drive system(s) 516 also include one or more communication connection(s) that enable communication by the respective drive system with one or more other local or remote computing device(s).

The computing device(s) 506 can include one or more processor(s) 520 and memory 522 communicatively coupled with the one or more processor(s) 520. In the illustrated example, the memory 522 of the computing device(s) 506 stores a localization component 524, a perception component 526, a prediction component 528, a planning component 530, and one or more system controller(s) 532. Though depicted as residing in the memory 522 for illustrative purposes, it is contemplated that the localization component 524, the perception component 526, the prediction component 528, the planning component 530, and the one or more system controller(s) 532 can additionally, or alternatively, be accessible to the computing device(s) 506 (e.g., stored in a different component of vehicle(s) 502 and/or be accessible to the vehicle(s) 502 (e.g., stored remotely).

In memory 522 of the computing device(s) 506, the localization component 524 can include functionality to receive data from the sensor system(s) 508 to determine a position of the vehicle(s) 502. For example, the localization component 524 can include and/or request/receive a three-dimensional map of an environment and can continuously determine a location of the autonomous vehicle within the map. In some instances, the localization component 524 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 524 can provide data to various components of the vehicle(s) 502 to determine an initial position of an autonomous vehicle for generating a trajectory, as discussed herein.

The perception component 526 can include functionality to perform object detection, segmentation, and/or classification. In some examples, the perception component 526 can provide processed sensor data that indicates a presence of an entity that is proximate to the vehicle(s) 502 and/or a classification of the entity as an entity type (e.g., car, pedestrian, cyclist, building, tree, road surface, curb, sidewalk, unknown, etc.). In additional and/or alternative examples, the perception component 526 can provide processed sensor data that indicates one or more characteristics (also referred to as parameters) associated with a detected entity and/or the environment in which the entity is positioned. In some examples, characteristics associated with an entity can include, but are not limited to, an x-position (global position), ay-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, a geographic position, an indication of darkness/light, etc.

The perception component 526 can include functionality to store perception data generated by the perception component 526. In some instances, the perception component 526 can determine a track corresponding to an object that has been classified as an object type. For purposes of illustration only, the perception component 526, using sensor system(s) 508 can capture one or more images of an environment. The sensor system(s) 508 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 508, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (collections of historical positions, orientations, sensor features, etc. associated with the object over time) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 528 can generate one or more probability maps representing prediction probabilities of possible locations of one or more objects in an environment. For example, the prediction component 528 can generate one or more probability maps for vehicles, pedestrians, animals, and the like within a threshold distance from the vehicle(s) 502. In some instances, the prediction component 528 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 530 can determine a path for the vehicle(s) 502 to follow to traverse through an environment. For example, the planning component 530 can determine various routes and paths and various levels of detail. In some instances, the planning component 530 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 530 can generate an instruction for guiding the autonomous vehicle along at least a portion of the route from the first location to the second location. In at least one example, the planning component 530 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 530 can alternatively, or additionally, use data from the perception component 526 to determine a path for the vehicle(s) 502 to follow to traverse through an environment. For example, the planning component 530 can receive data from the perception component 526 regarding objects associated with an environment. Using this data, the planning component 530 can determine a route to travel from a first location (e.g., a current location) to a second location (e.g., a target location) to avoid objects in an environment. In at least some examples, such a planning component 530 may determine there is no such collision free path and, in turn, provide a path which brings vehicle(s) 502 to a safe stop avoiding all collisions and/or otherwise mitigating damage.

In at least one example, the computing device(s) 506 can include one or more system controller(s) 532, which can be configured to control steering, propulsion, braking, safety, emitters, communication, and other systems of the vehicle(s) 502. These system controller(s) 532 can communicate with and/or control corresponding systems of the drive system(s) 516 and/or other components of the vehicle(s) 502, which may be configured to operate in accordance with a path provided from the planning component 530.

The vehicle(s) 502 can connect to one or more external computing device(s) 504 via network(s) 518. Computing device(s) 504 can include one or more processor(s) 534 and memory 536 communicatively coupled with the one or more processor(s) 534. In at least one instance, the one or more processor(s) 534 can be similar or identical to the processor(s) 520 and the memory 536 can be similar or identical to the memory 522. In the illustrated example, the memory 536 of the computing device(s) 504 stores a scenario component 538, a parameter component 540, an emulation component 542, a contour component 544, a probability component 546, and a scenario/vehicle performance component 548. In various example, one or more of the components within the memory 536 of the computing device(s) 504 may be combined, and/or the functionality of any components may be executed within other component(s) in other implementations. Additionally although depicted as residing in the memory 536 for illustrative purposes, it is contemplated that any or all of the scenario component 538, the parameter component 540, the emulation component 542, the contour component 544, the probability component 546, and the scenario/vehicle performance component 548 can, additionally or alternatively, be remotely accessible to the vehicle(s) 502 and/or the computing device(s) 504. For instance, any or all of the components within the computing device(s) 504 can be stored in a different component of computing device(s) 504, stored on the vehicle(s) 502, and/or stored remotely and accessible to the vehicle(s) 502 and computing device(s) 504 via one or more networks 518.

In memory 536 of the computing device(s) 504, the scenario component 538 may include functionality to select and/or generate base scenario data associated with a driving scenario. As described above, the base scenario data for a driving scenario may data defining a simulated driving environment, a simulated vehicle, and/or other vehicles, static objects, and dynamic objects with which the simulated vehicle may interact in the simulated driving environment. In some cases, the scenario component 538 may generate driving scenarios based on log data and/or additional input data. For instance, the scenario component 538 may use log data collected by a real or simulated vehicle traversing through a real or simulated environment, along with additional input data such as image data captured by the vehicle sensors or a dashboard camera, third-party data such as police incident reports, image data from traffic cameras, map data, etc. Based on the log data and/or input data, the scenario component may generate a driving scenario including a synthetic environment that represents at least a portion of the log data/input data. Examples of generating base scenario data for driving scenarios based on input data and/or log data can be found, for example, in U.S. patent application Ser. No. 16/392,094 titled "Scenario Editor and Simulator" and filed Apr. 23, 2019 which is incorporated by reference in its entirety.

In some examples, the scenario component 538 may scan the simulated environment and/or objects to determine object classifications (e.g., vehicles, bicycles, pedestrians, etc.) and scenario actions (e.g., crossing a street without a right-of-way, changing lanes, jaywalking, stopping at an intersection, and the like). The scenario component 538 can identify specific objects and scenario actions and label (and/or categorize) the objects and actions within the base scenario data. In some instances, the scenario component 538 can receive label data from a user of the scenario component and/or other external system to associate portions of driving scenario with labels in the base scenario data. In some instances, the scenario component 538 can generate a library of different driving scenarios, including base scenario data for each scenario, and may store the library of driving scenarios in a database. By way of example and without limitation, the library of scenarios can include crosswalk scenarios, merging scenarios, lane change scenarios, and the like. In at least some examples, the base scenario data may be manually specified. For example, one or more users may designate certain scenarios to be tested to ensure that the vehicle is capable of safely operating when performing such scenarios, despite having never (or rarely) previously encountered the scenario.

The parameter component 540 may include functionality to determine scenario parameters, including base parameter values and/or perturbed parameter values that have been updated from the base parameters using absolute or relative parameter offsets, for the driving scenarios in the base scenario data. In some examples, the base scenario data may include a base (or default) set of parameters for any or all objects in the driving scenario. Additionally, or alternatively, the base parameters for the objects in the driving scenarios of the base scenario data may be determined by the parameter component. As discussed above, the parameters of an object within a driving simulation may include, without limitation, the position, size, velocity, acceleration, trajectory, yaw, and/or pose of the object. The parameter component 540 may determine parameter data (e.g., parameter values, ranges, and/or distributions) associated with any of the parameters of the scenario objects. As noted above, parameter values may be used to perturb the base parameter values for scenario objects, to determine or generate parameterized scenarios.

In some examples, the parameter component 540 may analyze the base scenario data for a driving scenario and determine base and/or perturbed parameters associated with the scenario. For the simulated vehicle and each object in the scenario, the parameter component may determine a position of the object, a pose of the object, a size of the object, a velocity of the object, a track of the object, a distance between object and the simulated vehicle or any other object, and the like. The parameter component 540 also can determine parameter data including ranges and/or set of values associated with each base scenario parameter. For example, the parameter component can determine a classification (e.g., vehicle, pedestrian, bicycle, etc.) associated with each object represented in the base scenario data, and can determine a parameter range of values associated with the scenario parameter as represented by the base scenario data. As non-limiting examples, the parameter range for a pedestrian object can indicate that the pedestrian can have a velocity with a range of 0.5-1.5 m/s. For a vehicle object, the parameter range may indicate that the vehicle can have a velocity within a relative range (e.g., +/−30% of the base object velocity) or within an absolute range (e.g., 5 m/s of the base object velocity).

In some instances, the parameter component 540 also may determine a probability associated with a scenario parameter. By way of example and without limitation, the parameter component 540 may associate a probability distribution such as a Gaussian distribution (also referred to as a normal distribution) with the scenario parameter. In some instances, the parameter component 540 can determine the probability associated with the scenario parameter based on log data collected by a vehicle, perception error data, and/or various other input data. As discussed above, the parameter component 540 can determine a classification associated with an object represented in a driving scenario, and can determine other objects of the same classification within log data, base scenario data for other driving scenarios, and/or other input data. Then the parameter component 540 can determine the probability distributions of various scenario parameters using the log data, base scenario data, and/or other input data. As noted above, the probability distributions may be normal Gaussian distributions in some examples. In other examples, the probability distribution for any scenario parameters including the size, position, velocity, pose, and the like for any object in a driving scenario, may include any normal or non-normal distribution, including unimodal, bimodal, and/or multi-modal distributions.

As an example, the parameter component 540 may determine that 30% of pedestrians walk at a velocity below 0.3 meters per second, 30% of pedestrians walk at a velocity above 1.2 meters per second, and that 40% of pedestrians walk at a velocity between 0.3 and 1.2 meters per second. In this example, the parameter component 540 may use the distribution as a probability that a pedestrian in a crosswalk or jaywalking scenario will walk at a particular velocity. In some instances, the parameter component 540 can receive supplemental data that may be incorporated into a distribution for one or more scenario parameters. For instance, the parameter component 540 can determine scenario parameters indicating that a pedestrian can have a distance with a range of 30-60 meters to a vehicle while the vehicle travels at a velocity of 15 m/s or alternatively represented as a time-to-collision of 2-4 seconds. In this case, a regulation or guideline may indicate that the vehicle must handle scenarios with a 1.5 second time-to-collision which can be a lower bound (also referred to as a parameter threshold). The parameter component 540 can incorporate the regulation or guideline and determine a scenario parameter as having a 1.5 to 4.0 second time-to-collision (although any time range can be specified).

The emulation component 542 may include functionality to generate a surrogate model associated with a particular parameter space. In some examples, the surrogate model may be determined or otherwise generated based at least partly on evaluating random parameters of a parameter space a sufficient number of times to build a surrogate model that is configured to emulate the simulation component that was used to evaluate the first set of parameters. For example, the surrogate model may be determined by simulating points in the parameter space with a simulator until there is enough simulation results to build a surrogate (approximating) model that captures the main features of the simulation model. Once the surrogate model has been constructed, queries may be performed on the surrogate model without incurring the compute cost of directly simulating such scenarios, which may be costly to evaluate. Additionally, the emulation component 542 may validate the results of the scenarios that have been emulated by the surrogate model (the emulation results) by evaluating the scenarios using the simulation model and comparing those simulation results with the emulation results.

The contour component 544 may include functionality to determine one or more contours associated with a simulation parameter space. In some examples, a contour may be delineated by one or more parameters associated with a particular region of interest of the parameter space. For example, an initial contour may be determined based on an initial set of parameters of the parameter space, and a further iterative evaluation of an acquisition function may update the contour based on additional sets of parameters of the parameter space. Further, the acquisition function may utilize the second set of parameters 118 to identify one or more additional sets of parameters of the parameter space 106 to update the contour. In some examples, once a computational budget for the acquisition function has been exhausted, a threshold number of iterations has been reached, and/or during each iteration of the evaluation, the contour may be determined and/or further refined in association with the region of interest. For example, each iteration may return a set of results that correspond to parameters associated with the threshold value of the particular event of interest. That is, the threshold value associated with the particular event of interest may identify the contour (i.e., level set, excursion set, etc.). It should be noted that multiple contours may be determined, where each individual contour may represent a respective threshold value associated with the particular event of interest (e.g., the further the contour from the region of interest, the greater the threshold). As previously mentioned, with each iteration, the acquisition function may return more accurate results, thus updating the contour with each result leading to a more accurate contour, yielding results having a higher level of certainty.

In some examples, the contour component 544 may be configured to generate one or more contours associated with the simulation parameter space. Additionally, or alternatively, the contour component 544 may be configured to generate one or more heatmaps representing the one or more contours of the parameter space. In some examples, each individual region of the heatmaps may correspond to a threshold value associated with a region of interest.

The probability component 546 may include functionality to determine a probability that an evaluation of the surrogate model will return a result corresponding to a parameter being associated with the region of interest encapsulated by a contour (e.g., within the excursion set). In some examples, such a probability may be determined by imposing a fine grid on the parameter space and then quickly evaluating the underlying surrogate model. By performing a sufficient number of evaluations of the surrogate model, the results may be aggregated and/or otherwise analyzed to determine a probability of the surrogate model returning a result that corresponds to a parameter being associated with the region of interest and/or located inside of the contour of the parameter space.

Additionally, or alternatively, the probability component 546 may include functionality to determine a vehicle safety metric associated with the autonomous vehicle controller based at least partly on the probability that an evaluation of the surrogate model will return a result corresponding to a parameter being associated with the region of interest encapsulated by the contour. The probability component 546 may further analyze the in the context of the particular event of interest to determine a vehicle safety metric associated with an autonomous vehicle controller. In some examples, the vehicle safety metric may represent the likelihood of a vehicle encountering an adverse event under control of the simulated autonomous vehicle controller. For example, the vehicle safety metric may correspond to a collision probability of operating a vehicle using the simulated autonomous vehicle controller. Examples of an adverse event may include scenarios such as a collision event or near-collision event between a vehicle under control of the simulated autonomous vehicle controller and a simulated object (e.g., a car, a pedestrian, a bicyclist, a building, etc.), a rough ride event associated with the autonomous vehicle (e.g., sharp turns, rough terrain, hard starts/stops, etc.), and/or a change in state associated with the autonomous vehicle (e.g., a change in a planner decision such as a left turn event when a right turn event was more favorable in the given situation).

The scenario/vehicle performance component 548 may include functionality to aggregate the simulation results for the parameter scenarios executed as simulations and/or the emulation results for the parameter scenarios executed as emulations, with the expected simulation results and/or emulation results for the parameter scenarios not executed as simulations. In various examples, the scenario/vehicle performance component 548 may output various different types vehicle performance data including statistics and metrics associated with the performance of the vehicle controller within the driving scenario. For instance, the vehicle performance component 548 may include one or more data or vehicle safety metrics such as collision rates, near-miss collision rates, speed limit or traffic violation rates, rates of excess braking or acceleration, comfort metric compliance rates and/or any data associated with the performance of the vehicle controller within the driving scenario.

The processor(s) 520 of the computing device(s) 506 and the processor(s) 534 of the computing device(s) 504 can be any suitable processor capable of executing instructions to process data and perform operations as described herein. By way of example and not limitation, the processor(s) 520 and 534 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate array's (e.g., FPGAs, etc.), and other hardware devices can also be considered processors in so far as they are configured to implement encoded instructions.

The memory 522 computing device(s) 506 and the memory 536 of the computing device(s) 504 are examples of non-transitory computer-readable media. The memory 522 and 536 can store an operating system and one or more software applications, instructions, programs, and/or data to implement the methods described herein and the functions attributed to the various systems. In various implementations, the memory 522 and 536 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 522 and 536 can be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

EXAMPLE CLAUSES

A. A system comprising: one or more processors; and one or more non-transitory computer-readable media storing computer-executable instructions that, when executed, cause the system to perform operations comprising: receiving a first set of parameter values of a simulation parameter space associated with simulating an autonomous vehicle controller, the first set of parameter values being associated with a region of interest; generating, based at least in part on evaluating the first set of parameter values, a surrogate model associated with the simulation parameter space; determining, using Bayesian optimization and based at least in part on the first set of parameter values, a second set of parameter values of the simulation parameter space, the second set of parameter values being associated with the region of interest; determining, based at least in part on iteratively evaluating an acquisition function, a contour around the region of interest; determining, based at least in part on the contour, a probability that an evaluation of the surrogate model will return a result corresponding to a parameter value being associated with the region of interest corresponding to the contour; and determining a vehicle safety metric associated with the autonomous vehicle controller based at least in part on an exposure model and the probability.

B. The system of paragraph A, the operations further comprising determining, based at least in part on the contour and a second evaluation of the acquisition function, an updated contour associated with the region of interest.

C. The system of paragraph A or B, wherein the vehicle safety metric includes at least one of: a first probability of a vehicle, associated with the autonomous vehicle controller, colliding with a target entity; a second probability of the vehicle being within a threshold distance of a target entity; or an amount of time associated with the vehicle traveling to a target location.

D. The system of any one of paragraphs A-C, wherein the first set of parameter values comprise at least one of: a position of a vehicle associated with the autonomous vehicle controller; an orientation of the vehicle; a velocity of the vehicle; an acceleration of the vehicle; a pose of the vehicle; a signal associated with the vehicle; a level of friction between the vehicle and a surface on which the vehicle resides; a behavior classification associated with the vehicle; or a size of the vehicle.

E. The system of any one of paragraphs A-D, wherein the vehicle safety metric represents a likelihood of an autonomous vehicle encountering an adverse event under control of the autonomous vehicle controller, the adverse event comprising at least one of: a collision event associated with the autonomous vehicle; a near miss event associated with the autonomous vehicle; a rough ride event associated with the autonomous vehicle; or a change in state associated with the autonomous vehicle.

F. A method comprising: receiving first parameter values of a simulation parameter space associated with simulating an autonomous vehicle controller; determining a surrogate model associated with the simulation parameter space based at least in part on evaluating a simulation in accordance with the first parameter values; determining, based at least in part on an optimization of the simulation parameter space and the first parameter values, second parameter values of the simulation parameter space; determining, based at least in part on the first parameter values and the second parameter values, a contour around a region of interest, the region of interest being associated with the first parameter values and the second parameter values; determining, based at least in part on the contour, a probability that an evaluation of the surrogate model will return a result corresponding to a parameter value being associated with the region of interest corresponding to the contour; and determining a vehicle safety metric associated with the autonomous vehicle controller based at least in part on a probability model and the probability.

G. The method of paragraph F, further comprising: determining, using an acquisition function, third parameter values of the simulation parameter space based at least in part on the first parameter values and the second parameter values; and determining, based at least in part on the contour and the third parameter values, an updated contour associated with the region of interest.

H. The method of paragraph F or G, wherein the optimization is a Bayesian optimization, and the method further comprising generating the contour around the region of interest based at least in part on iteratively evaluating an acquisition function.

I. The method of any one of paragraphs F-H, wherein the vehicle safety metric represents a likelihood of an autonomous vehicle encountering an adverse event under control of the autonomous vehicle controller, the adverse event comprising at least one of: a collision event associated with the autonomous vehicle; a near miss event associated with the autonomous vehicle; a rough ride event associated with the autonomous vehicle; or a change in state associated with the autonomous vehicle.

J. The method of any one of paragraphs F-I, wherein the vehicle safety metric includes at least one of: a first probability of a vehicle, associated with the autonomous vehicle controller, colliding with a target entity; a second probability of the vehicle being within a threshold distance of a target entity; or an amount of time associated with the vehicle traveling to a target location.

K. The method of any one of paragraphs F-J, wherein the first parameter values comprise at least one of: a position of a vehicle associated with the autonomous vehicle controller; an orientation of the vehicle; a velocity of the vehicle; an acceleration of the vehicle; a pose of the vehicle; a signal associated with the vehicle; a level of friction between the vehicle and a surface on which the vehicle resides; a behavior classification associated with the vehicle; or a size of the vehicle.

L. The method of any one of paragraphs F-K, further comprising initializing the first parameter values based at least in part on an additional surrogate model.

M. The method of any one of paragraphs F-L, further comprising generating the surrogate model based at least in part on evaluating third parameter values of the simulation parameter space, the third parameter values being initialized at random.

N. One or more non-transitory computer-readable media storing instructions executable by one or more processors, wherein the instructions, when executed, cause the one or more processors to perform operations comprising: receiving first parameter values of a simulation parameter space associated with simulating an autonomous vehicle controller; determining a surrogate model associated with the simulation parameter space based at least in part on evaluating a simulation in accordance with the first parameter values; determining, based at least in part on an optimization of the simulation parameter space and the first parameter values, second parameter values of the simulation parameter space; determining, based at least in part on the first parameter values and the second parameter values, a contour around a region of interest, the region of interest being associated with the first parameter values and the second parameter values; determining, based at least in part on the contour, a probability that an evaluation of the surrogate model will return a result corresponding to a parameter value being associated with the region of interest corresponding to the contour; and determining a safety metric associated with the autonomous vehicle controller based at least in part on a probability model and the probability.

O. The one or more non-transitory computer-readable media of paragraph N, the operations further comprising: determining, using an acquisition function, third parameter values of the simulation parameter space based at least in part on the first parameter values and the second parameter values; and determining, based at least in part on the contour and the third parameter values, an updated contour associated with the region of interest.

P. The one or more non-transitory computer-readable media of paragraph N or O, wherein the optimization is a Bayesian optimization, and the operations further comprising generating the contour around the region of interest based at least in part on iteratively evaluating an acquisition function.

Q. The one or more non-transitory computer-readable media of any one of paragraphs N-P, wherein the safety metric represents a likelihood of an autonomous vehicle encountering an adverse event under control of the autonomous vehicle controller, the adverse event comprising at least one of: a collision event associated with the autonomous vehicle; a near miss event associated with the autonomous vehicle; a rough ride event associated with the autonomous vehicle; or a change in state associated with the autonomous vehicle.

R. The one or more non-transitory computer-readable media of any one of paragraphs N-Q, wherein the first parameter values comprise at least one of: a position of a vehicle associated with the autonomous vehicle controller; an orientation of the vehicle; a velocity of the vehicle; an acceleration of the vehicle; a pose of the vehicle; a signal associated with the vehicle; a level of friction between the vehicle and a surface on which the vehicle resides; a behavior classification associated with the vehicle; or a size of the vehicle.

S. The one or more non-transitory computer-readable media of any one of paragraphs N-R, further comprising initializing the first parameter values based at least in part on an additional surrogate model.

T. The one or more non-transitory computer-readable media of any one of paragraphs N-S, further comprising generating the surrogate model based at least in part on evaluating third parameter values of the simulation parameter space, the third parameter values being initialized at random.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body. "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the system to perform operations comprising:
      receiving a first set of parameter values of a simulation parameter space associated with simulating an autonomous vehicle controller, the first set of parameter values being associated with an area including a region of interest;
      generating, based at least in part on evaluating the first set of parameter values, a surrogate model associated with the simulation parameter space;
      determining, using Bayesian optimization and based at least in part on the first set of parameter values, a second set of parameter values of the simulation parameter space, the second set of parameter values being associated with the region of interest;
      determining, based at least in part on iteratively evaluating an acquisition function, a contour around the region of interest;
      determining, based at least in part on the contour, a probability that an evaluation of the surrogate model will return a result corresponding to a parameter value being associated with the region of interest corresponding to the contour; and
      determining a vehicle safety metric associated with the autonomous vehicle controller based at least in part on an exposure model and the probability.

2. The system of claim 1, the operations further comprising determining, based at least in part on the contour and a second evaluation of the acquisition function, an updated contour associated with the region of interest.

3. The system of claim 1, wherein the vehicle safety metric includes at least one of:
   a first probability of a vehicle, associated with the autonomous vehicle controller, colliding with a target entity;
   a second probability of the vehicle being within a threshold distance of a target entity; or
   an amount of time associated with the vehicle traveling to a target location.

4. The system of claim 1, wherein the first set of parameter values comprise at least one of:
   a position of a vehicle associated with the autonomous vehicle controller;
   an orientation of the vehicle;
   a velocity of the vehicle;
   an acceleration of the vehicle;
   a pose of the vehicle;
   a signal associated with the vehicle;
   a level of friction between the vehicle and a surface on which the vehicle resides;
   a behavior classification associated with the vehicle; or
   a size of the vehicle.

5. The system of claim 1, wherein the vehicle safety metric represents a likelihood of an autonomous vehicle encountering an adverse event under control of the autonomous vehicle controller, the adverse event comprising at least one of:
   a collision event associated with the autonomous vehicle;
   a near miss event associated with the autonomous vehicle;
   a rough ride event associated with the autonomous vehicle; or
   a change in state associated with the autonomous vehicle.

6. The system of claim 1, the operations further comprising determining, based at least in part on a second iterative evaluation of an acquisition function, an updated contour.

7. The system of claim 1, the operations further comprising determining, based at least in part on iteratively evaluating an acquisition function, a threshold; and determining, based at least in part on the threshold, a contour around the region of interest.

8. A method comprising:
receiving first parameter values of a simulation parameter space associated with simulating an autonomous vehicle controller;
determining a surrogate model associated with the simulation parameter space based at least in part on evaluating a simulation in accordance with the first parameter values;
determining, based at least in part on an optimization of the simulation parameter space and the first parameter values, second parameter values of the simulation parameter space;
determining, based at least in part on the first parameter values and the second parameter values, a contour around a region of interest, the region of interest being associated with the second parameter values;
determining, based at least in part on the contour, a probability that an evaluation of the surrogate model will return a result corresponding to a parameter value being associated with the region of interest corresponding to the contour; and
determining a vehicle safety metric associated with the autonomous vehicle controller based at least in part on a probability model and the probability.

9. The method of claim 8, further comprising:
determining, using an acquisition function, third parameter values of the simulation parameter space based at least in part on the first parameter values and the second parameter values; and
determining, based at least in part on the contour and the third parameter values, an updated contour associated with the region of interest.

10. The method of claim 8, wherein the optimization is a Bayesian optimization, and the method further comprising generating the contour around the region of interest based at least in part on iteratively evaluating an acquisition function.

11. The method of claim 8, wherein the vehicle safety metric represents a likelihood of an autonomous vehicle encountering an adverse event under control of the autonomous vehicle controller, the adverse event comprising at least one of:
a collision event associated with the autonomous vehicle;
a near miss event associated with the autonomous vehicle;
a rough ride event associated with the autonomous vehicle; or
a change in state associated with the autonomous vehicle.

12. The method of claim 8, wherein the vehicle safety metric includes at least one of:
a first probability of a vehicle, associated with the autonomous vehicle controller, colliding with a target entity;
a second probability of the vehicle being within a threshold distance of a target entity; or
an amount of time associated with the vehicle traveling to a target location.

13. The method of claim 8, wherein the first parameter values comprise at least one of:
a position of a vehicle associated with the autonomous vehicle controller;
an orientation of the vehicle;
a velocity of the vehicle;
an acceleration of the vehicle;
a pose of the vehicle;
a signal associated with the vehicle;
a level of friction between the vehicle and a surface on which the vehicle resides;
a behavior classification associated with the vehicle; or
a size of the vehicle.

14. The method of claim 8, further comprising initializing the first parameter values based at least in part on an additional surrogate model.

15. The method of claim 8, further comprising generating the surrogate model based at least in part on evaluating third parameter values of the simulation parameter space, the third parameter values being initialized at random.

16. One or more non-transitory computer-readable media storing instructions executable by one or more processors, wherein the instructions, when executed, cause the one or more processors to perform operations comprising:
receiving first parameter values of a simulation parameter space associated with simulating an autonomous vehicle controller;
determining a surrogate model associated with the simulation parameter space based at least in part on evaluating a simulation in accordance with the first parameter values;
determining, based at least in part on an optimization of the simulation parameter space and the first parameter values, second parameter values of the simulation parameter space;
determining, based at least in part on the first parameter values and the second parameter values, a contour around a region of interest, the region of interest being associated with the second parameter values;
determining, based at least in part on the contour, a probability that an evaluation of the surrogate model will return a result corresponding to a parameter value being associated with the region of interest corresponding to the contour; and
determining a safety metric associated with the autonomous vehicle controller based at least in part on a probability model and the probability.

17. The one or more non-transitory computer-readable media of claim 16, the operations further comprising:
determining, using an acquisition function, third parameter values of the simulation parameter space based at least in part on the first parameter values and the second parameter values; and
determining, based at least in part on the contour and the third parameter values, an updated contour associated with the region of interest.

18. The one or more non-transitory computer-readable media of claim 16, wherein the optimization is a Bayesian optimization, and the operations further comprising generating the contour around the region of interest based at least in part on iteratively evaluating an acquisition function.

19. The one or more non-transitory computer-readable media of claim 16, further comprising initializing the first parameter values based at least in part on an additional surrogate model.

20. The one or more non-transitory computer-readable media of claim 16, further comprising generating the surrogate model based at least in part on evaluating third parameter values of the simulation parameter space, the third parameter values being initialized at random.

* * * * *